United States Patent [19]

Yamada et al.

[11] Patent Number: 5,010,264
[45] Date of Patent: Apr. 23, 1991

[54] MINIATURE MOTOR HAVING POSITIVE-COEFFICIENT THERMISTOR

[75] Inventors: Shinjiro Yamada; Seiki Satoh, both of Utsunomiya; Kazuichi Mabuchi, Matsudo; Shiei Kitao, Matsudo; Yoshiaki Egawa, Matsudo, all of Japan

[73] Assignees: Mabuchi Motor Co., Ltd., Chiba; Mitsui Mining & Smelting Co., Tokyo, both of Japan

[21] Appl. No.: 402,499

[22] Filed: Sep. 1, 1989

[30] Foreign Application Priority Data

Sep. 9, 1988 [JP] Japan .......................... 63-118363[U]
Dec. 14, 1988 [JP] Japan .......................... 63-162101[U]

[51] Int. Cl.$^5$ ...................... H02K 11/00; H01C 7/02; H02H 5/04
[52] U.S. Cl. .................... 310/72; 310/68 C; 338/25; 361/106
[58] Field of Search ...................... 310/68 C, 68 R, 71, 310/72, 220, 229; 318/473; 338/25; 361/27, 31, 105, 106

[56] References Cited

U.S. PATENT DOCUMENTS

| | | | |
|---|---|---|---|
| 4,177,396 | 12/1979 | Wang | 310/68 C |
| 4,293,789 | 10/1981 | King | 310/68 C |
| 4,408,244 | 10/1983 | Weible | 310/68 C |
| 4,698,614 | 10/1987 | Welch et al. | 338/25 |
| 4,789,800 | 12/1988 | Zimmermann | 310/68 C |
| 4,792,877 | 12/1988 | Thornton | 361/27 |
| 4,801,833 | 1/1989 | Dye | 310/68 C |
| 4,816,192 | 3/1989 | Abou-Aly et al. | 261/130 |

FOREIGN PATENT DOCUMENTS 2811503 12/1978 Fed. Rep. of Germany .... 310/68 C

Primary Examiner—Steven L. Stephan
Assistant Examiner—Clayton E. LaBalle
Attorney, Agent, or Firm—McGlew & Tuttle

[57] ABSTRACT

A miniature motor having a positive-coefficient thermistor in which a first supporting member made of an electrically conductive material and electrically connected to at least any one of a pair of brushes housed in a motor cover plate, and a second supporting member made of an electrically conductive material and electrically connected to an external terminal are provided; a positive-coefficient thermistor being supported between the first and second supporting members.

This construction makes the assembly of the motor easy, leading to improved productivity, and allows the motor to have a positive overheat preventing function without adding to the number of parts.

9 Claims, 6 Drawing Sheets

MINIATURE MOTOR HAVING POSITIVE-COEFFICIENT THERMISTOR

BACKGROUND OF THE INVENTION

1. Field of the Invention

This invention relates generally to a miniature motor, and more particularly to a miniature motor having a positive-coefficient thermistor in which the overheat of the miniature motor is prevented by effectively detecting motor temperature to control overcurrent by the positive-coefficient thermistor mounted on a motor cover plate, and the size of the motor is reduced and productivity is improved without adding to the number of parts or increasing the size of the motor by providing the positive-coefficient thermistor.

2. Description of the Prior Art

Figure 1:
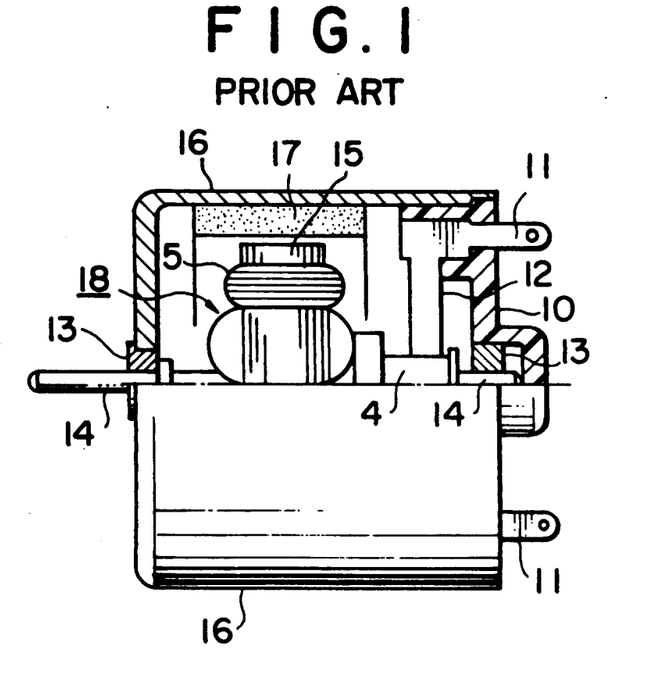
FIG. 1 is a diagram illustrating a conventional type of miniature motor which is publicly known and has essentially the same construction as the present invention.

FIG. 1 is a diagram illustrating a conventional type of miniature motor which is publicly known and has essentially the same construction as the present invention. The miniature motor shown in FIG. 1 comprises terminals 11 supported by a motor cover plate 10, brushes 12 making contact with a commutator 4 fixedly fitted to a motor shaft 14; and electric current is fed to rotor windings 5 wound on a rotor core 15 fixedly fitted to the motor shaft 14 via the commutator 4, and thereby a rotor 18 existing in a field formed by a parmanent magnet 17 fixedly fitted to the inner circumferential surface of a motor case 16 is caused to rotate.

The miniature motor shown in FIG. 1 has wide applications, including automotive electrical components (such as motor-driven rear-view mirrors, motor-driven windows, etc.), motor-powered toys, and tape recorders. Having a low output, the miniature motor tends to be overloaded due to a trifling trouble in the driven parts (such as rusting, entry of dirt and dust, for example), leading to the overheat or burnout of the rotor windinigs.

The most commonly used method of preventing the rotor windings from being overheated is to cut off current in the event of overload, using a bimetal, fuse, or heat-sensitive element relay.

However, these conventional methods have various problems: (1) The bimetal method is poor in operating performance at low voltages; (2) the fuse method involves the changing of fuses when burned out; (3) the heat-sensitive element relay method results in the increased size of the circuit device.

Figure 2:
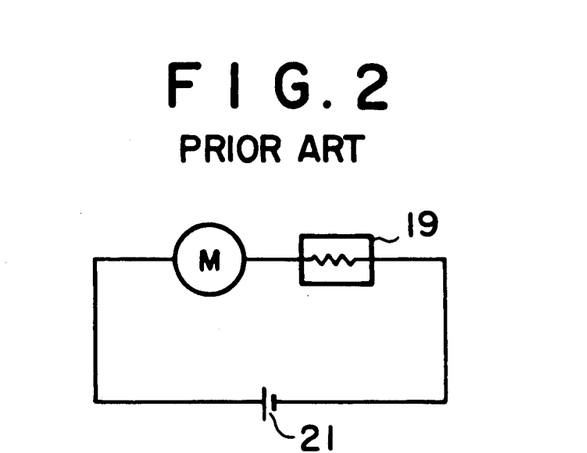
FIG. 2 is a diagram of assistance in explaining the overheat preventing function of the positive-coefficient thermistor.

As an overheat-preventing means that can solve these problems there is a well-known method of feeding power to a miniature motor M from a power source 21 via a positive-coefficient thermistor 19, as shown in FIG. 2. The positive-coefficient thermistor 19 is usually disposed in such a manner as to come in close contact with the inside of the miniature motor M or the surface of the motor case in order to effectively detect the temperature of the miniature motor M.

The positive-coefficient thermistor 19 has such a characteristic that its resistance sharply increases as temperature exceeds a certain level (100° C., for example). Consequently, if a sustained overload applied to the miniature motor M, or a forcible locking of motor revolution, would produce overcurrent in the rotor winding 5, the temperature of the miniature motor M rises, causing the internal resistance of the positive-coefficient thermistor 19 to rapidly increase, leading to a sharp decline in the current fed to the miniature motor M and thereby successfully preventing overheating of the miniature motor M.

In the conventional type of miniature motor having the aforementioned positive-coefficient thermistor, the positive-coefficient thermistor is usually fitted to the outside or the inside of the motor in such a manner as to make close contact with the motor case.

A miniature motor having a positive-coefficient thermistor outside the motor requires a separate housing device, equipped with connecting terminals, etc., for housing the positive-coefficient thermistor. This results in an increased number of parts involved as well as in the increased manhours and cost of assembly. Installation of the thermistor outside the motor also poses an unwanted problem of a protruded profile of the motor.

A miniature motor having a positive-coefficient thermistor inside the motor, on the other hand, involves a space for housing the positive-coefficient thermistor. To cope with this, a motor-driven device having an overheat preventing function has been proposed in Japanese Laid-Open Utility Model Application No. 120226/1986, in which a motor case is bulged to provide a space for housing the positive-coefficient thermistor. With this construction, however, the fabrication of the motor case requires much labor, offering an unwanted structural problem of an additional projection.

SUMMARY OF THE INVENTION

It is therefore an object of this invention to provide a miniature motor having a positive-coefficient thermistor for preventing the overheat of the miniature motor in which the positive-coefficient thermistor is provided in a motor cover plate to improve the response of the positive-coefficient thermistor and the overheat preventing function of the motor.

It is another object of this invention to provide a miniature motor having a positive-coefficient thermistor which allows the overheat preventing function to be imparted to the motor without the need for a separate device for housing the positive-coefficient thermistor and additional parts.

It is still another object of this invention to provide a miniature motor having a positive-coefficient thermistor in which even when terminals of different shapes are employed, other component parts than the terminals can be used in common merely by changing the terminals alone, thus leading to a substantial improvement in productivity in the manufacture of miniature motors.

It is a further object of this invention to provide a miniature motor having a positive-coefficient thermistor in which the positive-coefficient thermistor is provided in a motor cover plate, and the content of common component parts is increased to reduce the manhours for installing those parts and prevent the profile of the motor from being expanded.

One feature of the miniature motor of this invention is that the miniature motor of this invention comprises a stator having a permanent magnet for forming a field, and a rotor having a plurality of rotor windings wound on a rotor core, brushes supported by a motor cover plate for feeding current to the rotor windings by making contact with a commutator, and a positive-coefficient thermistor for controlling current to the rotor windings, in which a pair of internal terminals, made of an electrically conductive material, to be connected to external terminals, and a pair of brush arms, made of an electrically conductive materials, formed integrally with brushes are provided in a motor cover plate; and the positive-coefficient thermistor is supported between a supporting member made of an electrically conductive material and electrically connected to at least any one of the internal terminals, and another supporting member made of an electrically conductive material and electrically connected to at least any one of the brush arms.

DESCRIPTION OF THE PREFERRED EMBODIMENT

Figure 3:
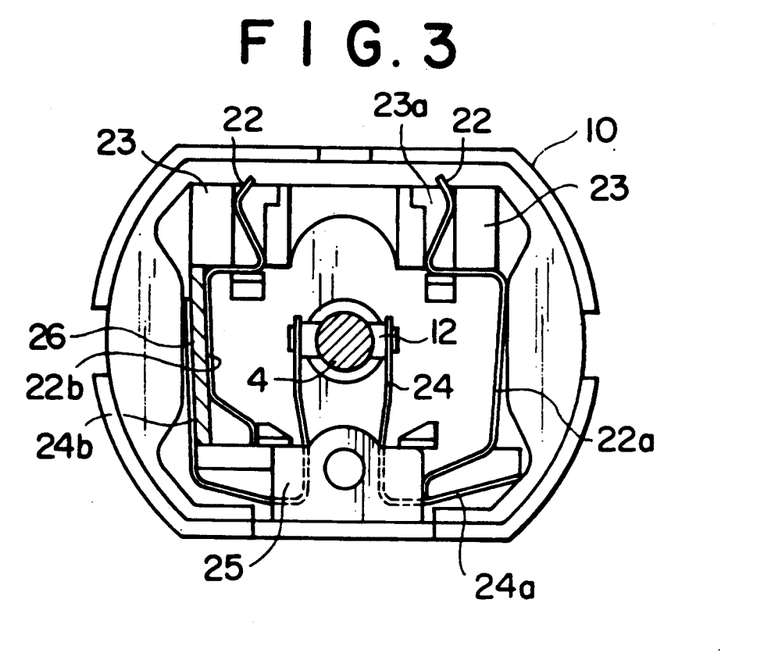
FIG. 3 is a partially sectional side view of the essential part of the first embodiment of the miniature motor having a positive-coefficient thermistor of this invention.

FIG. 3 is a partially sectional side view of the essential part of an embodiment of the miniature motor having a positive-coefficient thermistor of this invention. Like parts are shown by like reference numerals shown in FIG. 1. In FIG. 3, numeral 22 refers to a pair of internal terminals, formed from a strip made of copper, copper alloy or other electrically conductive material, housed and supported in a recess 23a defined by a terminal holder 23 integrally provided on the inside surface of a motor cover plate 10, with the legs 22a and 22b thereof being extended along the inside surface of the motor cover plate 10. Internal terminals 22 are disposed near the outer periphery of the motor cover plate 10 in such a manner that the internal terminals 22 can be electrically connected to external terminals (not shown). Numeral 24 refers to a pair of brush arms made of strips of an electrically conductive material and engaged in brush holders 25 having L-shaped grooves so that brushes 12 integrally fitted to the free end thereof hold a commutator 4 between them. The brush holders 25 are integrally fitted to the inside surface of the motor cover plate 10. The other ends 24a and 24b of the brush arms 24 are extended along the inside surface of the motor cover plate 10, with the end 24a being electrically connected to the leg 22a of the internal terminal 22, and the end 24b being formed almost in paralled with the other end 22b of the internal terminal 22 and arranged in such a manner as to hold a positive-coefficient thermistor 26 formed into a leaf shape.

With the above construction, a miniature motor can be assembled as shown in FIG. 1 above, and caused to rotate by feeding power to the internal terminals 22 via external terminals (not shown) connected thereto. If the miniature motor is continuously overloaded, or the rotation of the motor is forcibly locked, the internal resistance of the positive-coefficient thermistor 26 held between one leg 22b of the internal terminal 22 and one end 24b of the brush arms 24 suddenly increases, causing the current fed to the miniature motor to be reduced sharply to prevent the overheat of the miniature motor.

Figure 4:
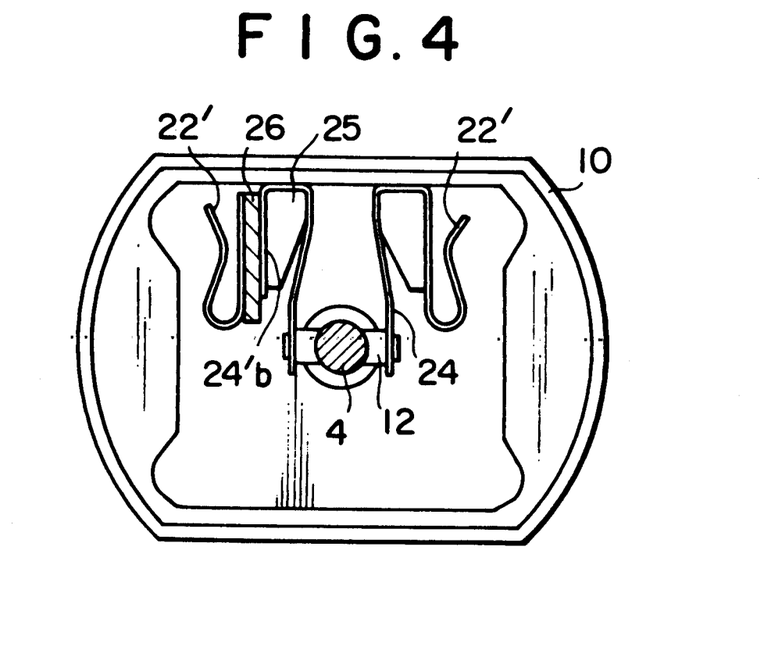
FIG. 4 is a partially sectional side view of the essential part of the second embodiment of the miniature motor having a positive-coefficient thermistor according to this invention.

FIG. 4 is a partially sectional side elevation of the essential part of another embodiment of this invention. Like parts are indicated like numerals shown in FIG. 3. In FIG. 4, internal terminals 22' are formed into an almost U shape; one internal terminal 22' being integrally formed with a brush arm 24. A positive-coefficient thermistor 26 is held between another internal terminal 22' and an end 24b of another brush arm 24. This embodiment shows the brush holder 25 of a construction in which part of a terminal holder 23 shown in FIG. 3 is used as the brush holder 25.

With this construction, the same operation of reducing feed current as with the embodiment shown in FIG. 3 can be accomplished.

Although this embodiment shows an example where supporting members for supporting the positive-coefficient thermistor are formed by a leg of the internal terminals, or the internal terminal itself and an end of the brush holders, the supporting members can be freely formed, taking into account the shape, dimensions and other factors of the miniature motor. The supporting members may be formed into any shape so long as the positive-coefficient thermistor is held between at least an internal terminal and a brush holder. Needless to say, the shapes of the internal terminals, brush holders, positive-coefficient thermistor, and supporting members are not limited to those described in this embodiment, but may be selected appropriately taking into consideration the shape and dimensions of the miniature motor.

Figure 5A:
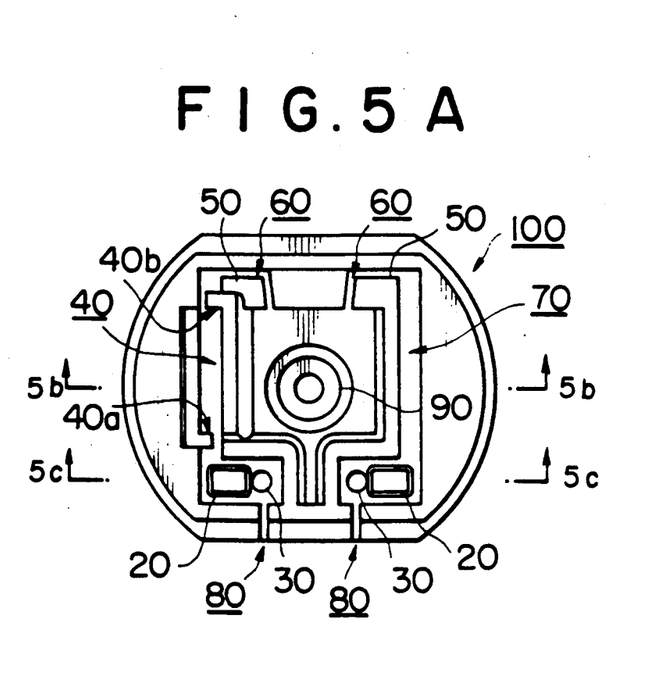
FIG. 5A is a front view of the inside of the motor cover plate.
Figure 5B:
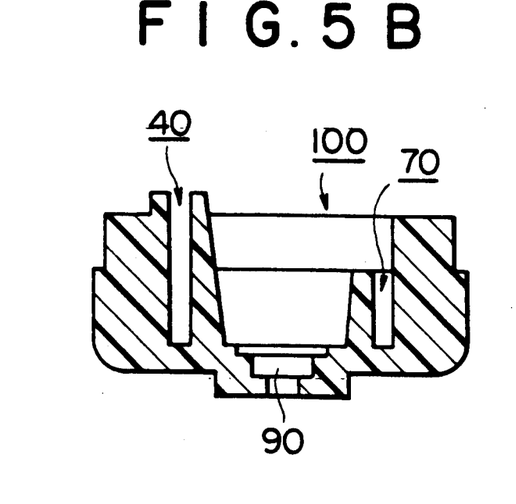
FIG. 5B is a cross section taken along line A—A in FIG. 5A.
Figure 5C:
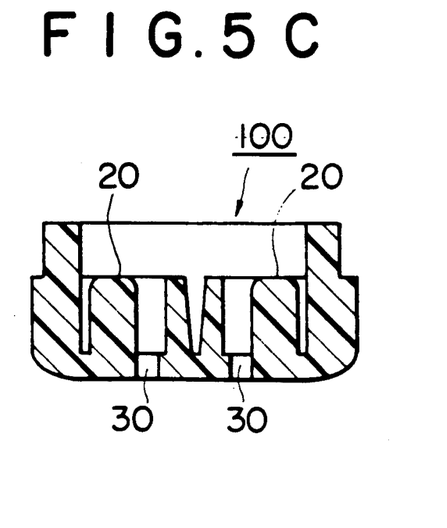
FIG. 5C is a cross section taken along line B—B in FIG. 5A.

FIGS. 5A through 5C are diagrams of assistance in explaining a motor cover plate to which various component elements constituting still another embodiment of this invention are fitted. FIG. 5A is a front view of the inside of the motor cover plate, FIG. 5B a cross-sectional view taken along line A—A shown in FIG. 5A, FIG. 5C a cross-sectional view taken along line B—B shown in FIG. 5A, and FIG. 6 a perspective view of parts fitted to the motor cover plate shown in FIG. 5.

Figure 6:
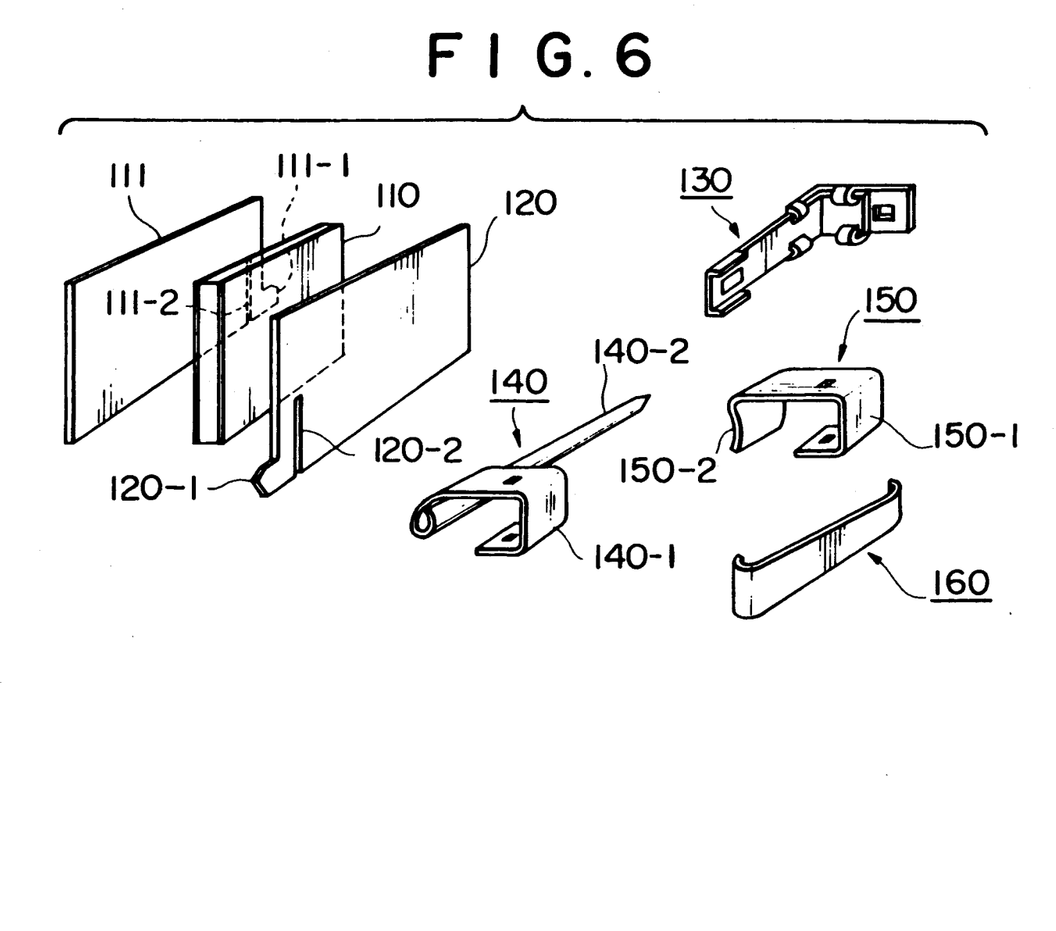
FIG. 6 is a perspective view of parts to be mounted on the motor cover plate shown in FIG. 1.
Figure 7:
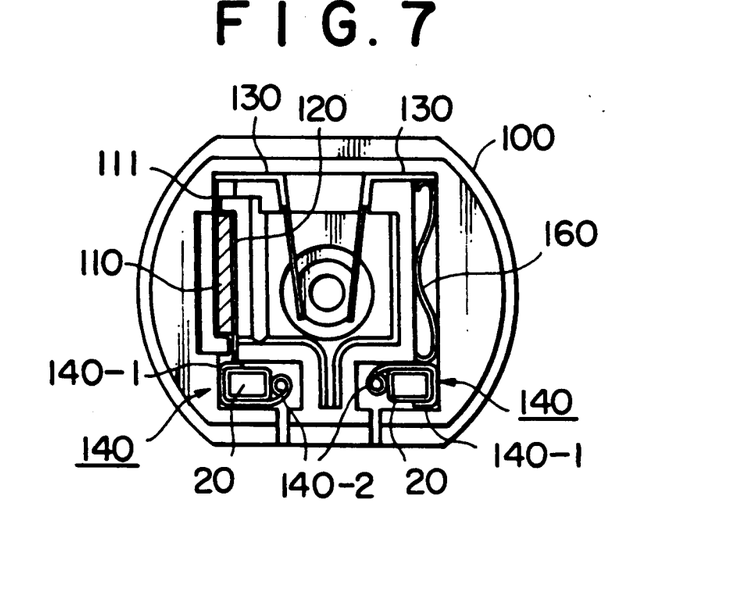
FIG. 7 is a diagram illustrating the inside of the motor cover plate in the third embodiment of this invention.
Figure 8:
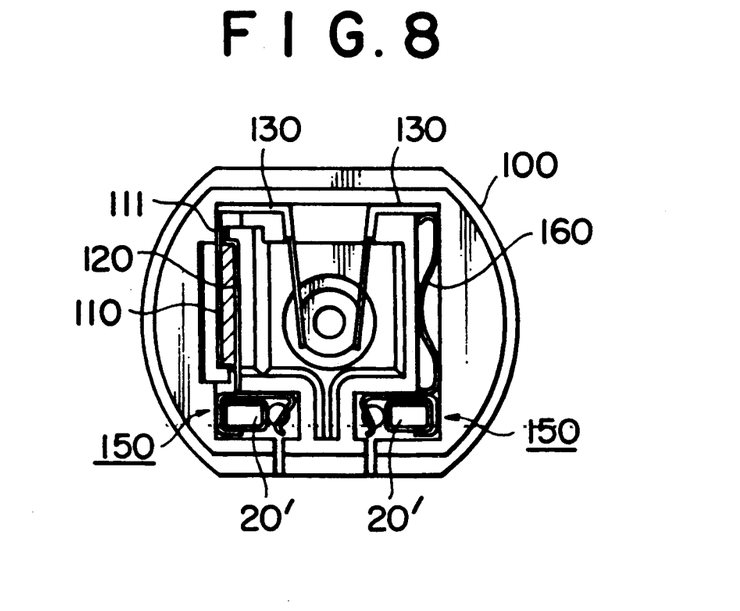
FIG. 8 is a diagram illustrating the inside of the motor cover plate in the fourth embodiment of this invention.

Embodiments in which the component elements shown in FIGS. 5A through 5C and 6 are fitted to the motor cover plate are shown in FIGS. 7 and 8. FIG. 7 shows a miniature motor having protruded harness pins and FIG. 8 shows a miniature motor of an inserted harness type, both motors using a common motor cover plate and a common positive-coefficient thermistor.

Prior to description of embodiments shown in FIGS. 7 and 8, the motor cover plate used in the embodiments shown in FIG. 7 and 8 and parts fitted to the motor cover plate will be described, referring to FIGS. 5a–5c and 6. In the figure, numeral 100 refers to a motor cover plate; 20 to a terminal holder; 30 to a protruded terminal insertion hole; 40 to a thermistor housing; 50 to a brush arm holder; 60 to a brush arm engaging grove; 70 to a connecting member housing; 80 to a harness insertion hole; 90 to a bearing holder; 110 to a positive-coefficient thermistor; 111 to a first supporting member; 120 to a second supporting member; 111-1 and 120-1 to resilient contacting portions; 111-2 and 120-2 to slits; 130 to an internal terminal; 140-1 and 150-1 to an engaging and locking portion; 140-2 and 150-2 to terminal portions; and 160 to a connecting member, respectively.

In FIGS. 5a-5c, the motor cover plate 100 is made of synthetic resin, and the terminal holders 20 and 20 for holding a pair of the protruded terminal 140, which will be described later, or the internal terminals 150 are provided integrally with the inside surface of the motor cover plate 100. Furthermore, the brush arm holders 50 and 50 for holding a pair of brush arms 130 are provided integrally with the inside surface of the motor cover plate 100. The groove-shaped thermistor housing 40, in which the positive-coefficient thermistor 110 is housed and held by the first and second supporting members 111 and 120, is also formed. The terminal portion 140-2 of the protruded terminal 140 is inserted into the protruded terminal insertion hole 30. The harness insertion hole 80 is used for receiving power terminal or protruding terminal portion (not shown) in the case of the harness-insertion type miniature motor. The bearing holder 90 is used for receiving a bearing supporting a motor shaft (not shown). The embodiments shown in FIGS. 7 and 8 are constructed by fitting the parts shown in FIG. 6 to the motor cover plate 100.

In FIG. 7, a pair of the protruded terminals 140 are fixedly fitted to the terminal holders 20. The protruded terminal 140 consists of the engaging and locking portion 140-1 for engaging and press-fitting in the terminal holder 20, and the terminal portion or projecting terminal end 140-2 which is integrally formed with the engaging and locking portion 140-1, and is fixedly fitted to the motor cover plate 100 by engaging and press-fitting the engaging and locking portion 140-1 into the terminal holder 20 while inserting the terminal portion 140-2 into the protruded terminal insertion hole 30 (see FIG. 5). As shown in the figure, by fitting a pair of the protruded terminals 140 in a linearly symmetrical state, the protruded terminals 140 of the same shape can be used. A pair of the brush arms 130 are press-fitted to the brush arm engaging groove 60 (see FIGS. 5a-5c formed on the periphery of the brush arm holder 50.

Furthermore, the positive-coefficient thermistor 110 held between the first and second supporting members 111 and 120 is housed in the thermistor housing 40 (see FIG. 5). The first and second supporting members 111 and 120 are made of an electrically conductive spring material and have resilient contacting portions 111-1 and 120-1, which are protruded outwards from the edge thereof, and the slits 111-2 and 120-2 are formed by cutting the lower edge thereof near the resilient contacting portion 111-1 and 120-1. The length of the first supporting member 111 (the length from the tip of the resilient contacting portion 111-1 to the other edge thereof) is made longer by a predetermined length than the distance between one dead-end portion (40a in FIG. 5) of the thermistor housing 40 and the brush arm 130, while the length of the second supporting member 120 (the length from the tip of the resilient contacting portion 120-1 to the other end thereof) is made longer by a predetermined length than the distance between the other dead-end portion (40b in FIG. 1) of the thermistor housing 40 and the protruded terminal 140. The first supporting member 111 is fitted to the thermistor housing 40 in such a manner that the resilient contacting portion 111-1 comes in contact with the brush arm 130, and the other edge of the first supporting member 111 comes in contact with the dead-end portion 40a. In the above-mentioned state, the contact pressure exerted on the brush arm 130 by the resilient contacting portion 111-1 becomes sufficient to ensure the electrical connection between the first supporting member 111 and the brush arm 130 because the length of the first supporting member 111 is longer by a predetermined length than the distance between the dead-end portion 40a and the brush arm 130, and the other edge of the first supporting member 111 comes into contact with the dead-end portion 40a. The existence of the slit 111-2 prevents the unwanted deformation of the resilient contacting portion 111-1.

The second supporting member 120 is fitted to the thermistor housing 40 in such a manner that the resilient contacting portion 120-1 comes in contact with the protruded terminal 140, and the other edge of the second supporting member 120 comes in contact with the dead-end portion 40b. In such a state, the contact pressure exerted on the protruded terminal 140 by the resilient contacting portion 120-1 becomes sufficient to ensure the electrical connection between the second supporting member 120 and the protruded terminal 140, as in the case of the electrical connection between the first supporting member 111 and the brush arm 130.

As described above, the brush arm 130 and the protruded terminal 140 are positively connected electrically to each other via the first supporting member 111, the positive-coefficient thermistor 110 and the second supporting member 120.

The other brush arm 130 and the protruded terminal 140 are electrically connected via the connecting member 160. The connecting member 160 is made of an electrically conductive spring material, and formed in such a manner that the length thereof is made longer by a predetermined length than the distance between the brush arm 130 and the protruded terminal 140. Consequently, the resilient force produced by the deflection of the connecting member 160 caused as the connecting member 160 is fitted between the brush arm 130 and the protruded terminal 140 makes the state of contact between the brush arm 130 and the protruded terminal 140 sufficient to ensure electrical connection.

The embodiment shown in FIG. 8 is a miniature motor of an inserted harness type, having essentially the same construction and effects as the embodiment shown in FIG. 7. That is, the embodiment shown in FIG. 8 is exactly the same as the embodiment shown in FIG. 7, except that the internal terminal 150 shown in FIG. 6 is fitted, in place of the protruded terminal 140 in the embodiment shown in FIG. 7.

In FIG. 8, a pair of the internal terminals 150 are fixedly fitted to the terminal holders 20. The internal terminal 150 consists of the engaging and locking portion 150 (of the same construction as the engaging and contacting portion 140-1 in the protruded terminal 140 shown in FIG. 7), which is engaged and press-fitted to the terminal holder 20, and the terminal portion 150-2 integrally formed with the engaging and locking portion 150-1, and fixedly fitted by engaging and press-fitting the engaging and locking portion 150 to the terminal holder 20. By fitting a pair of the internal terminals in a linearly symmetrical state, as shown in the figure, the internal terminals 150 having the same shape can be used. Description of other parts has been omitted because the construction of other parts is exactly the same as the embodiment shown in FIG. 7, as noted earlier.

As described above, this invention makes it possible to manufacture miniature motors having different types of positive-coefficient thermistors at substantially improved productivity because this invention can adapt to the use of different types of terminals by merely changing terminals, with other component parts used in common.

Figure 9:
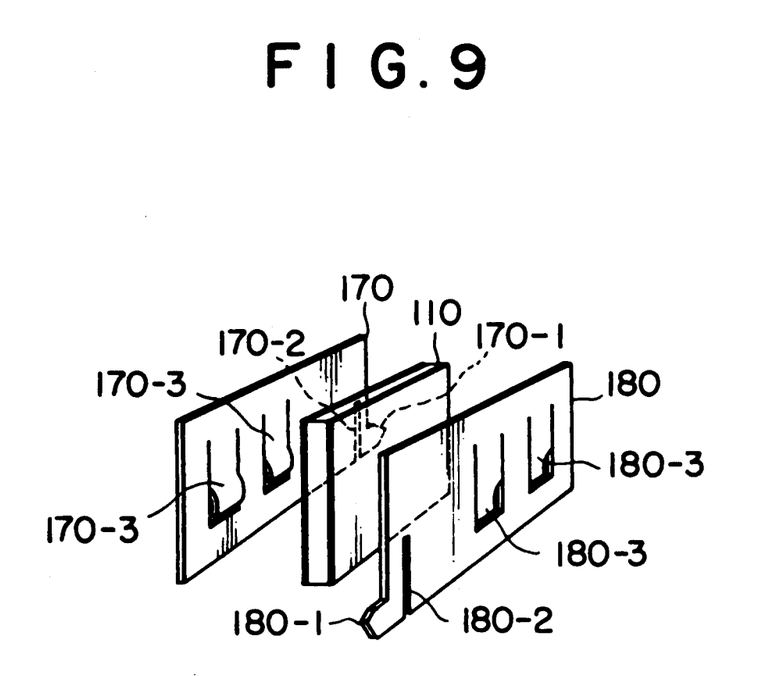
FIG. 9 is a perspective view of assistance in explaining another example of supporting members applied to this invention.

FIG. 9 shows still another embodiment of supporting members applied to this invention. The supporting members shown in the figure have essentially the same construction as the supporting members used in the embodiments shown in FIGS. 7 and 8. In the embodiment shown in FIG. 9, resilient lanced and raised pieces, which will be described later, are provided on the first and second supporting members 111 and 120 shown in FIGS. 7 and 8 to ensure a positive electrical connection between the supporting members and the positive-coefficient thermistor 110. Reference numeral 110 in the figure refers to a positive-coefficient thermistor; 170 to a first supporting member; 180 to a second supporting member; 170-1 and 180-1 to resilient contacting portions; 170-2 and 180-2 to slits; and 170-3 and 180-3 to resilient lanced and raised piece, respectively.

In FIG. 9, the resilient lanced and raised piece 170-3 is formed by lancing the first supporting member 170 into a ractangular shape, with one side thereof left uncut, and raising the lanced portion toward the side of the positive-coefficient thermistor 110. Similarly, the resilient lanced and raised piece 180-3 is formed on the second supporting member 180. Consequently, in the state where the positive-coefficient thermistor 110 is held by the first and second supporting members 170 and 180 in the thermistor housing 40, the positive-coefficient thermistor 110 can be brought into positive contact with the first and second supporting members 170 and 180 by the resiliency of the resilient lanced and raised pieces 170-3 and 180-3. This leads to improved electrical connection among them.

Since this invention has the above-mentioned construction and operation, the need for an independent device for housing a positive-coefficient thermistor can be eliminated, the overheat preventing function can be imparted to the motor without adding the number of parts, and productivity in the manufacture of miniature motors can be improved. Furthermore, this invention, in which the positive-coefficient thermistor is housed in the motor cover plate and the number of common component elements is increased, permits the use of terminals of different shapes merely by changing terminals, and facilitates the handling of miniature motors both in the manufacture and use of them. Furthermore, the construction of housing the positive-coefficient thermistor in the motor cover plate eliminates the need for expanding the motor case, leading to compact and small-sized miniature motors.

What is claimed is:

1. A miniature motor having a positive-coefficient thermistor comprising a stator having a permanent magnet as a field, a rotor formed by winding a plurality of rotor windings on a rotor core; current being fed to said rotor windings via a commutator making sliding contact with brushes supported by a motor cover plate, making contact with a commutator; and a positive coefficient thermistor for controlling current to said rotor windings, in which said motor cover plate has a pair of terminal holders for holding terminals;

said terminals including a pair of terminals made of an electrically conductive material and having engaging and locking portions for engaging with said terminal holders;
said brushes including a pair of brush arms made of an electrically conductive material;
connecting members disposed in such a manner as to come in resilient contact with any one of said brush arms and one of said terminals to ensure an electrical connection between said brush arms and said terminals;
a first supporting member disposed in such a manner as to come in resilient contact with one of said brush arms to electrically connect to said brush arms; and,
a second supporting member disposed in such a manner as to come in resilient contact with the other one of said terminals are provided in said motor cover plate; said positive-coefficient thermistor being held between said first and second supporting members.

2. A miniature motor having a positive-coefficient thermistor as set forth in claim 1 wherein said terminal holders, brush arm holders for holding said brush arms, a connecting member housing for housing said connecting members, a thermistor housing for housing said thermistor, and a bearing holder for holding a bearing of said miniature motor are formed integrally with said motor cover plate.

3. A miniature motor having a positive-coefficient thermistor as set forth in claim 1, wherein said pair of terminals are held by said pair of terminal holders and include protruding terminal portions, each protruding terminal portion including projecting terminal ends through which electrical power is supplied.

4. A miniature motor having a positive-coefficient thermistor as set forth in claim 1 wherein a pair of terminals held by a pair of said terminal holders are internal terminals of an inserted harness type having engaging and locking portions.

5. A miniature motor having a positive-coefficient thermistor as set forth in claim 1 wherein said motor cover plate is made of synthetic resin.

6. A miniature motor having a positive-coefficient thermistor as set forth in claim 1 wherein said first and second supporting members for holding said positive-coefficient thermistor are made of an electrically conductive spring material.

7. A miniature motor having a positive-coefficient thermistor as set forth in claim 1 wherein said first and second supporting members have resilient contacting portions, and the length thereof in the longitudinal direction is made longer by a predetermined length than the distance between each dead-end portion of said thermistor housing and said brush arms.

8. A miniature motor having a positive-coefficient thermistor as set forth in claim 1 wherein said connecting members are made of an electrically conductive spring material, and the length thereof is made longer by a predetermined length than the distance between said protruded terminals, or said internal terminals, fitted to said brush arms.

9. A miniature motor having a positive-coefficient thermistor as set forth in claim 6 wherein resilient lanced and raised pieces are provided on the mutually opposing surfaces of said first and second supporting members for holding said positive-coefficient thermistor.

* * * * *